United States Patent
Oka et al.

Patent Number: 6,157,384
Date of Patent: Dec. 5, 2000

[54] APPARATUS AND METHOD FOR DRAWING

[75] Inventors: Masaaki Oka, Kanagawa; Toshiyuki Hiroi, Tokyo, both of Japan

[73] Assignee: WINX Corporation, Tokyo, Japan

[21] Appl. No.: 08/930,648

[22] PCT Filed: Feb. 6, 1997

[86] PCT No.: PCT/JP97/00297

§ 371 Date: Jan. 20, 1998

§ 102(e) Date: Jan. 20, 1998

[87] PCT Pub. No.: WO97/29457

PCT Pub. Date: Aug. 14, 1997

[51] Int. Cl.[7] .................................................. G06F 15/00
[52] U.S. Cl. ............................................................ 345/425
[58] Field of Search .................................... 345/425, 419, 345/430, 427, 429

[56] References Cited

U.S. PATENT DOCUMENTS 5,179,638  1/1993  Dawson et al. ........................ 395/125
5,461,712  10/1995  Chelstowski et al. .................. 395/164

FOREIGN PATENT DOCUMENTS 6-020063  1/1994  Japan .
6-251166  9/1994  Japan .
7-230555  8/1995  Japan .
7-296173  11/1995  Japan .

*Primary Examiner*—Phu K. Nguyen
*Attorney, Agent, or Firm*—Fulwider Patton Lee & Utecht LLP

[57] ABSTRACT

The picture drawing method is in a graphics computer, a special effect device or a video game machine. Data required for picture drawing is generated by pre-processing by a pre-processor 32 based on a drawing command for drawing a picture model defined by the combination of unit figures, and pixel data is generated on the unit figure basis by texture mapping based on the generated data for drawing a picture on a frame buffer 18. The texture data required by a drawing engine 33 is transferred in the pre-processing stage from a texture area on the frame buffer 18 to a texture cache 33F, and the pre-processor 32 and the drawing engine 33 are operated in pipelining. This enables texture mapping or MIP mapping without halting picture drawing means, while reducing the number of time texture memory is accessing and the accessing time for raising the overall picture drawing speed.

4 Claims, 14 Drawing Sheets

APPARATUS AND METHOD FOR DRAWING

BACKGROUND OF THE INVENTION

1. Field of the Invention

This invention relates to a picture drawing apparatus and a picture drawing method used in a graphics computer, a special effect device or a video game machine which are a video equipment employing computers.

2. Related Art

In a picture generating device in a domestic TV game machine, personal computers or graphics computers, used for generating data of a picture outputted for display to a television receiver, a monitor receiver or a cathode ray tube (CRT) display device, a dedicated drawing device is provided between central processing unit (CPU) and a frame buffer for enabling high-speed processing.

That is, in the above-mentioned picture generating device, the CPU when generating a picture does not directly access the frame buffer, but performs geometry processing, such as coordinate transformation, clipping or light source calculations, defines a three-dimensional model as combination of basic unit figures, such as triangles or quadrangles, in order to formulate a drawing command for drawing a three-dimensional picture, and sends the drawing command thus generated to the drawing device. For generating, for example, a three-dimensional object, the object is resolved into plural polygons and a drawing command for each polygon is sent from the CPU to the drawing device. The drawing device interprets the drawing command sent from the CPU to execute rendering processing of writing pixel data in the frame buffer, taking into account the Z-values and colors of all pixels making up the polygon, from the Z-values specifying color data and depth of the apex points, for drawing a figure on the frame buffer. The Z-values represent the information specifying the distance from the viewing point along the depth direction.

If, for example, a three-dimensional object is displayed in the above-described picture generating device, the object is resolved into plural polygons, and a drawing command associated with each polygon is transmitted from the CPU to the drawing device. For representing the object more realistically, there are used techniques termed texture mapping or MIP mapping. There are also widely known techniques of converting picture color data via a color lookup table (CLUT) having stored therein color conversion data for changing the display colors.

The texture mapping is a technique of affixing a two-dimensional picture pattern provided separately as a texture source picture to the surface of a polygon constituting the object. The MIP mapping, on the other hand, is among the techniques of texture mapping of interpolating pixel data so that the affixing pattern on the polygon will not be non-spontaneous in case the three-dimensional model is moved towards or away from the viewing point.

Meanwhile, the picture drawing speed depends on the processing speed of texture mapping or MIP mapping for each polygon in a drawing engine. Moreover, the picture drawing speed is influenced by the writing speed from the drawing engine to the frame buffer, such that, if the frame buffer accessing speed is low, the drawing speed is lowered. Therefore, if an expensive high-speed memory is used as a large-capacity frame buffer, for increasing the drawing speed, the system cost is prohibitively increased. However, if an inexpensive dynamic random-access memory (DRAM) is used, the drawing speed of the system is lowered.

In view of the above depicted status of the art, the present invention has for its objects to provide the following.

That is, it is an object of the present invention to provide a picture drawing device and a picture drawing method whereby a high drawing speed may be maintained even with the use of an inexpensive memory, such as DRAM, as a frame buffer.

It is another object of the present invention to provide a picture drawing device and a picture drawing method whereby, in the picture drawing device for executing texture mapping by drawing means, drawing processing can be executed without stopping the drawing means.

It is yet another object of the present invention to provide a picture drawing device and a picture drawing method whereby the number of times of accessing and the accessing time of the picture memory can be decreased to raise the overall picture drawing speed.

SUMMARY OF THE INVENTION

A picture drawing apparatus according to the present invention includes pre-processing means for generating data required for drawing processing prior to drawing processing on the unit figure basis in accordance with a drawing command for drawing a picture model defined by the combination of unit figures, picture drawing means for generating pixel data on the unit figure basis by texture mapping processing responsive to the drawing command for drawing a picture on a picture memory, storage means for transient storage of texture data required by the picture drawing means for texture mapping, and supplying means for supplying the texture data required by the picture drawing means for texture mapping to the storage means responsive to data outputted by the pre-processing means.

In the picture drawing device according to the present invention, the picture drawing means has the function of performing MIP mapping, the picture drawing means selecting texture data having the desired resolution responsive to data outputted by the pre-processing means for supplying the selected texture data to the storage means.

A picture drawing method according to the present invention includes the steps of generating data pertinent to picture drawing processing on the unit figure basis in accordance with a drawing command for drawing a picture model defined by the combination of unit figures, supplying texture data necessary for texture mapping in the picture drawing processing to storage means based on the data, generating pixel data of a unit figure by texture processing for drawing on a picture memory and drawing a picture on a picture memory.

In the picture drawing method according to the present invention, the step of supplying the texture data to the storage means includes a step of supplying texture data of resolution required in MIP mapping in the picture drawing processing responsive to data pertinent to the picture drawing processing.

With the picture drawing device and method according to the present invention, picture drawing means transmit texture data required for texture mapping from a texture memory to a texture cache in a pre-processing stage by the pre-processing means. The pre-processing means and picture drawing means are operated in pipelining for enabling picture drawing without halting the picture drawing means.

With the picture drawing device and method according to the present invention, data of the resolution required for the picture drawing means to perform the MIP mapping is selected from the texture data on the texture memory in the pre-processing stage by the pre-processing means and transmitted to the texture cache for reducing the number of times of accessing and the accessing time for the texture memory for raising the overall picture drawing speed.

BRIEF DESCRIPTION OF THE DRAWINGS

FIG. 10 illustrates the accessing address obtained by the masking.

DETAILED DESCRIPTION OF THE PREFERRED EMBODIMENTS

Figure 1:
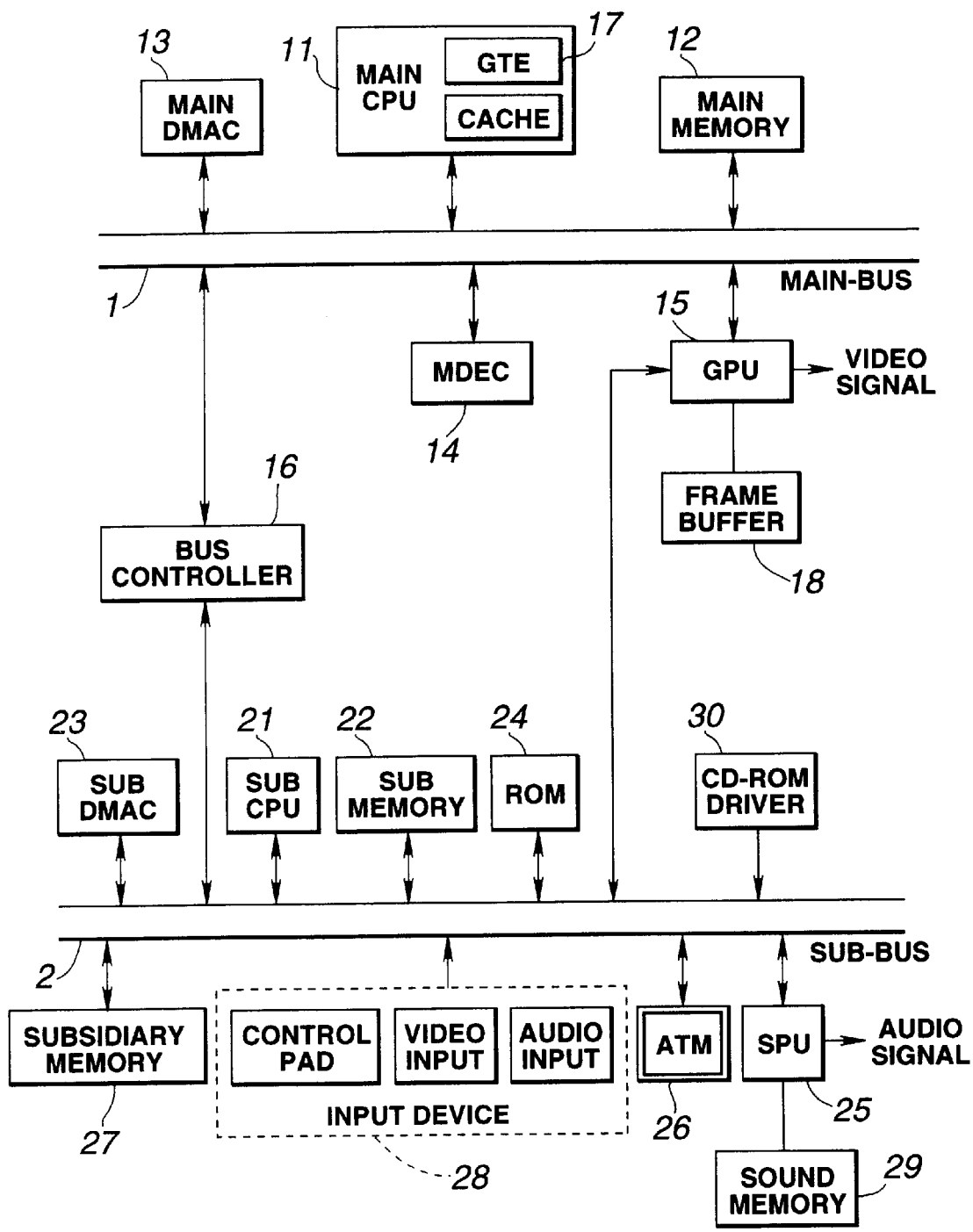
FIG. 1 is a block diagram showing the structure of a video game machine embodying the present invention.

Referring to the drawings, preferred embodiments of the present invention will be explained in detail. The drawing device according to the present invention is applied to a video game device as shown in FIG. 1. The drawing method according to the present invention is carried out on this video game device.

The video game machine executes a game in accordance with instructions by the user by reading and executing a game program stored in an auxiliary memory device such as an optical disc, and has a configuration as shown in FIG. 1.

Specifically, the present video game device has two sorts of buses, namely a main bus 1 and a sub-bus 2.

The main bus 1 and the sub-bus 2 are interconnected via a bus controller 16.

To the main bus 1 are connected a central processing unit (CPU) 11, made up of a micro-processor, a main memory 12, made up of a random access memory (RAM), a main dynamic memory access controller or main DMAC 13, a MPEG decoder 14 and a picture processing unit or graphic processing unit (GPU) 15. To the sub-bus 2 are connected a subsidiary central processing unit or sub-CPU 21, made up of a micro-processor, a subsidiary memory, made up of a random access memory (RAM), a subsidiary dynamic memory accessing controller or sub DMAC 23, a read-only memory (ROM) 24, having stored therein a program, such as an operating system, a sound processing unit (SPU) 25, a communication controller or asynchronous transmission mode (ATM) 26, an auxiliary storage device 27, an input device 28 and a CD-ROM driver 30.

The bus controller 16 is a device on the main bus 1 for switching between the main bus 1 and the sub-bus 2, and is opened in an initial state.

The main CPU 11 is a device on the main bus 1 operating by a program on the main memory 12. Since the bus controller 16 is open on start-up, the main CPU 11 reads in a boot program from the ROM 24 on the sub-bus 2 to reproduce the application program and necessary data from the ROM 24 on the sub-bus 1 for loading on the main memory 12 or on devices on the sub-bus 2. On the main CPU 11 is loaded a geometry transfer engine (GTE) 17 for performing processing such as coordinate transformation. This GTE 17 has a parallel computing mechanism for carrying out plural computing processing operations in parallel and is responsive to a request for computing processing from the CPU 11 in order to carry out fast processing operations, such as coordinate transformation, light source calculations, matrix or vector operations. Based on the results of computing processing operations by the GTE 17, the main CPU 11 defines a three-dimensional model as a combination of basic unit figures, such as triangles or quadrangles, formulates a drawing command associated with each polygon for drawing a three-dimensional picture and packetizes the drawing command in order to route the resulting command packet to the GPU 15.

The main DMAC 13 is a device on the main bus 1 for performing control such as DMA transfer on the devices on the main bus 1. If the bus controller 16 is open, the main DMAC 13 also controls the devices on the sub-bus 2.

The CPU 15 is a device on the main bus 1 functioning as a rendering processor. This GPU 15 interprets the drawing command sent from the main CPU 11 or main DMAC 13 as command packet and performs rendering processing of writing pixel data in the frame buffer 18 from Z-values specifying depth and color data of all pixels making up a polygon.

The MDEC 14 is an I/O connection device operable in parallel with the main CPU 11 and is a device functioning as a picture expansion engine. The MDEC 14 decodes picture data compressed and encoded by orthogonal transform, such as discrete cosine transform.

On the sub-bus 2, the sub-CPU 21 is a device on the sub-bus 2 operating in accordance with a program on the sub-memory 22.

The sub-DMAC 23 is a device on the sub-bus 2 for performing control such as DMAC transfer for devices on the sub-bus 2. This sub-DMAC 23 can acquire bus rights only when the bus controller 16 is closed.

The SPU 25 is a device on the sub-bus 2 functioning as a sound processor. This SPU 25 is responsive to a sound command sent as a command packet from the sub-CPU 21 or sub-DMAC 23 as a command packet to read out sound source data from the sound memory 29 to output the read-out data.

The ATM 26 s a communication device on the sub-bus 2.

The auxiliary storage device 27 is a data input/output device on the sub-bus 2 and is made up of a non-volatile memory, such as a flash memory. This auxiliary storage device 27 temporarily holds on memory data such as game progress or scores.

The CD-ROM driver 30 is a data input device on the sub-bus 2 and reproduces an application program and necessary data from the CD-ROM.

The input device 28 is an input device from other equipments, such as a control pad on the sub-bus 2, man-machine interface, picture input or speech input.

That is, in the above-described video game machine, the geometry processing system, executing geometry processing, such as coordinate transformation, clipping or light source calculations, formulating a drawing command for defining a three-dimensional model as combination of basic unit figures (polygons) such as triangles or quadrangles for drawing a three-dimensional picture, and sending out the drawing command associated with each polygon as command packet to the main bus 1, is made up of the main CPU 11 and the GTE 17 on the main bus 1. Also, in the video game machine, the rendering processing system for formulating pixel data of each polygon based on the drawing command from the geometry processing system for writing a figure in the frame buffer 18 by way of rendering processing for drawing a figure in the frame buffer 18 is constituted by the GPU 15.

The above-mentioned GPU 15 is explained in detail.

Figure 2:
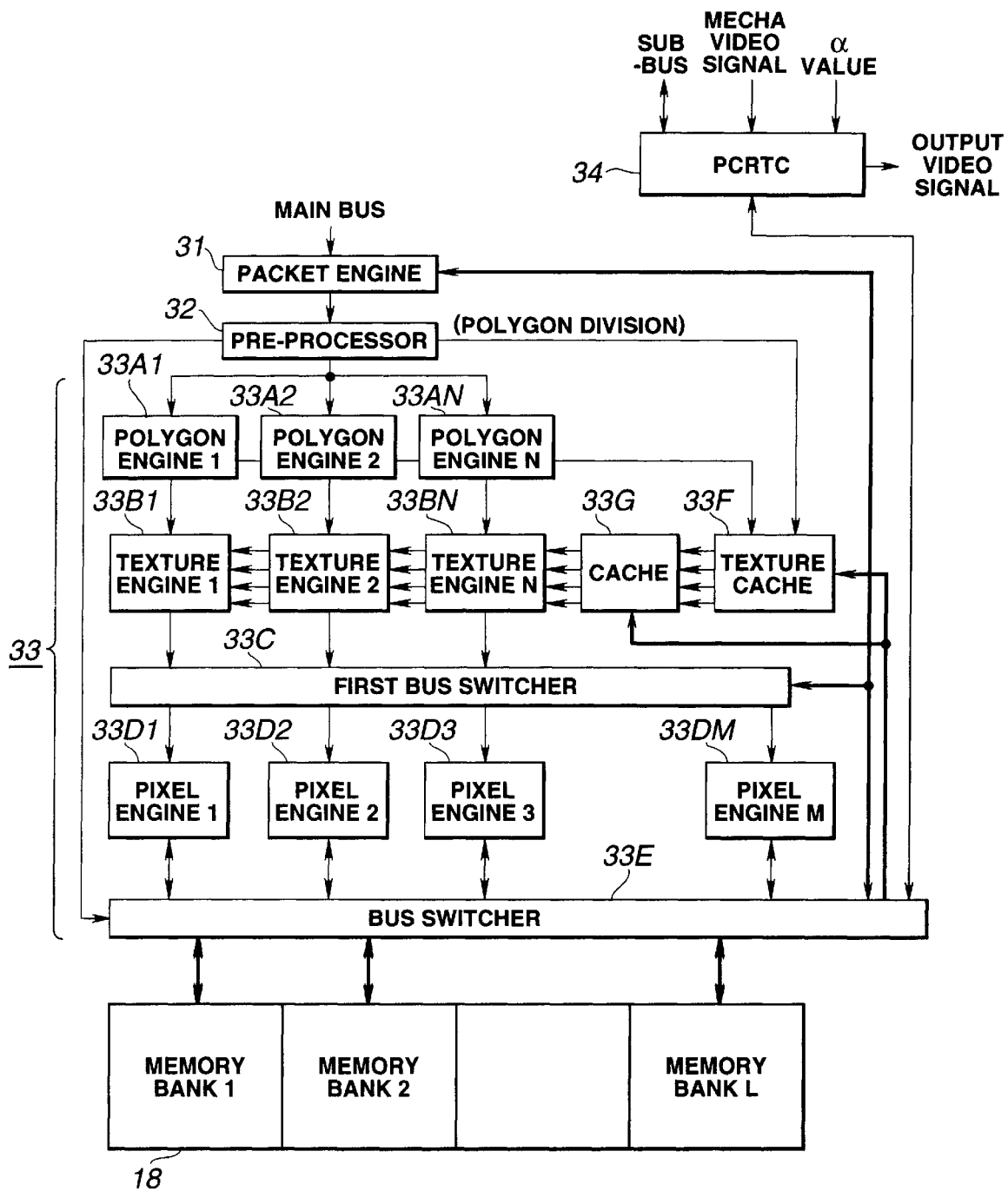
FIG. 2 is a block diagram showing a detailed structure of a GPU in the video game machine.
Figure 3:
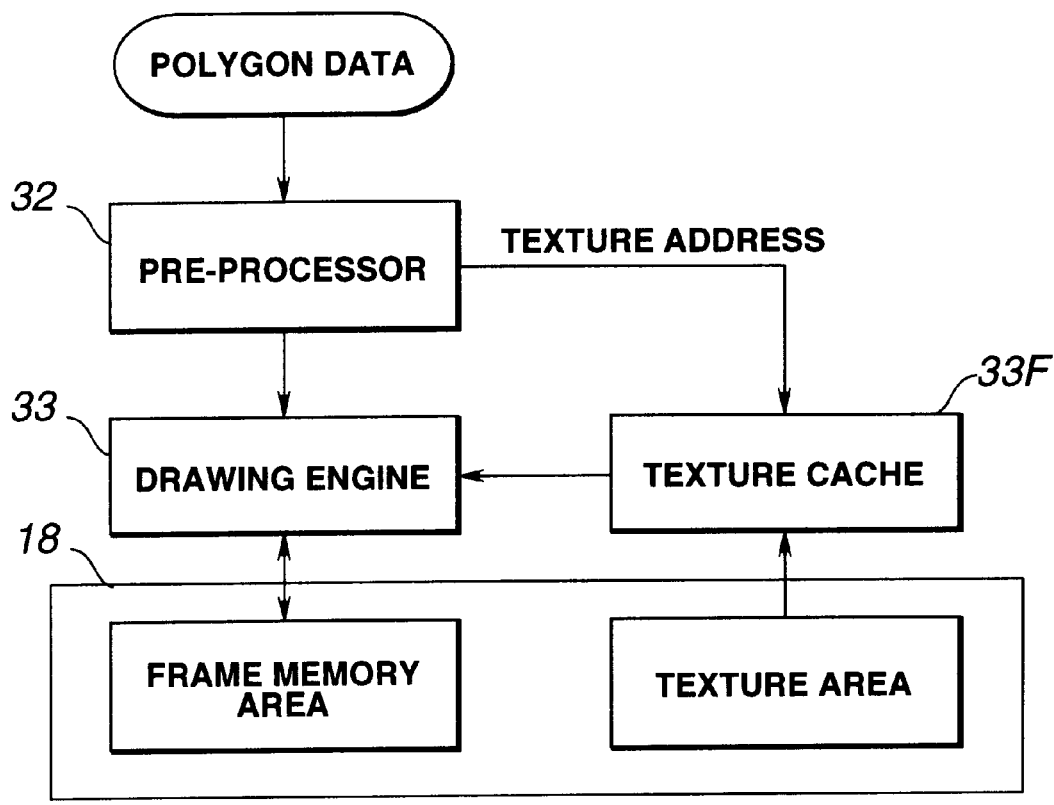
FIG. 3 is a block diagram showing the basic structure of the GPU.

Referring to FIG. 2, the GPU 15 includes a packet engine 31 connected to the main bus 1 shown in FIG. 1 and performs rendering processing of writing pixel data of each polygon in the frame buffer 18 by the pre-processor 32 and the drawing engine 33 in accordance with the drawing command sent as a command packet from the main CPU 11 or main DMAC shown in FIG. 1 over the main bus 1 to the packet engine 31, reading out pixel data of the picture drawn in the frame buffer 18 and furnishing the read-out pixel data via CRT controller 34 as video signals to a television receiver or a monitor receiver, not shown.

The packet engine 31 develops the command packet sent from the main CPU 11 or main DMAC 13 shown in FIG. 1 over the main bus 1 on a register, not shown.

The pre-processor 32 generates polygon data in accordance with the drawing command sent to the packet engine 31 as command packet and performs pre-set pre-processing, such as polygon division as later explained, on the polygon data, while generating various data such as apex point coordinate information for the respective polygons required by the drawing engine 33, address information such as texture or MIP map texture, or control information, such as pixel interleaving.

The drawing engine 33 includes N polygon engines 33A1, 33A2, . . . , 33AN, connected to the pre-processor 32, N texture engines 33B1, 33B2, . . . , 33BN, connected to the polygon engines 33A1, 33A2, . . . , 33AN, a first bus switcher 33C, connected to the texture engines 33B1, 33B2, . . . , 33BN, M pixel engines 33D1, 33D2, . . . , 33DM, connected to the first bus switcher 33C, a second bus switcher 33E, connected to the pixel engines 33D1, 33D2, . . . , 33DM, a texture cache 33F connected to the second bus switcher 33E, and a CLUT cache 33G connected to the texture cache 33F.

In the drawing engine 33, the N polygon engines 33A1, 33A2, . . . , 33AN sequentially generate polygons in accordance with the drawing command on the basis of the polygon data pre-processed by the pre-processor 32 for performing parallel shading processing from one polygon to another.

The N texture engines 33B1, 33B2, . . . , 33BN perform texture mapping or MIP Mapping in parallel, based on the texture data supplied from the texture cache 33F via color lookup table (CLUT) cache 33G, on each of the polygons generated by the polygon engines 33A1, 33A2, . . . , 33AN.

The pre-processor 32 previously furnishes the address information, such as texture or MIP MAP texture, affixed to the polygons processed by the N texture engines 33B1, 33B2, . . . , 33BN, to the texture cache 33F. Based on the above address information, the texture data necessary for texture mapping is transferred from the texture area on the frame buffer 18, while only resolution data necessary for MIP Mapping is selected from the relevant texture data so as to be transferred as MIP MAP texture data. To the CLUT cache 33G CLUT data to be referred to during texture drawing is transferred from the CLUT area on the frame buffer 18.

The polygon data, processed with texture mapping or MIP Mapping by the N texture engines 33B1, 33B2, . . . , 33BN, are transferred via first bus switcher 33C to M pixel engines 33D1, 33D2, . . . , 33DM.

The M pixel engines 33D1, 33D2, . . . , 33DM perform various picture processing operations, such as Z-buffer processing or anti-aliasing processing, in parallel, for generating M pixel data.

The M pixel data, generated by the M pixel engines 33D1, 33D2, . . . , 33DM, are written in the frame buffer 18 via second bus switcher 33E.

The second bus switcher 33E is fed with the pixel interleaving control information from the pre-processor 32. The second bus switcher 33E has the function of performing pixel interleaving processing of selecting L pixel data from the M pixel data generated by the M pixel engines 33D1, 33D2, . . . , 33DM in accordance with the above control information for writing M pixel data with M storage locations conforming to the shape of the polygon drawn on the frame buffer 18 as accessing unit.

The drawing engine 33 generates and writes all pixel data of each polygon in the frame buffer 18, based on the polygon data pre-processed by the pre-processor 32, for drawing a picture defined as the combination of the polygons by the drawing command on the frame buffer 18. Thus the pixel data of the picture drawn on the frame buffer 18 is read out by the second bus switcher 33E so as to be furnished via CRTC 34 as video signals to a television receiver or to a monitor receiver, not shown.

In the above-described structure of the GPU 15, the pre-processor 32 generates the address information for pre-reading the texture affixed to the polygon processed by the N texture engines 33B1, 33B2, . . . , 33BN, . . . , based on the apex point coordinates [(X0, Y0), (X1, Y1), (X2, Y2)] of the polygons and the texture coordinates [(U0, V0), (U1, V1), (U2, V2)]. In addition, the GPU 15 reproduces the MIP mapping selection information from the tilt of the sides of the polygons [(X1−X0)/(Y1−Y0), [(X2−X0)/(Y2−Y0), [(X1−X2)/(Y1−Y2)], tilt of the texture addresses [(U1−U0)/(Y1−Y0), [(U2−U0)/(Y2−Y0), [(U1−U2)/(Y1−Y2), [(V1−V0)/(Y1−Y0), [(V2−V0)/(Y2−Y0), [(V1−V2)/(Y1−Y2), . . . , or the polygon areas, to furnish the information to the texture cache 33F. The GLUT 15 sorts the polygon apex point coordinates [(X0, Y0), (X1, Y1), (X2, Y2)] in the sequence of the apex points of the left edges (X0, Y0)→(X1, Y1)→(X2, Y2) or in the sequence of the apex points of the right edges (X2, Y2)→(X1, Y1)→(X0, Y0) or scans both end points or texture addresses.

The pre-processor 32 stores the information corresponding to the pre-processed polygon data in a work memory, not shown. At a stage in which the drawing engine 33 can process the next polygon, the information capable of processing one polygon is transferred from the work memory to the N polygon engines 33A1, 33A2, . . . , 33AN. This causes the drawing engine 33 to start drawing processing for a new polygon.

That is, with the present GPU 15, the pre-processor 32 and the drawing engine 33 executes drawing processing by pipelining processing for drawing a picture defined as the combination of the polygons under a drawing command.

The drawing processing by this pipelining processing is again explained.

The pre-processor 32 performs pre-set pre-processing on the polygon data as described above and furnishes various data, such as the apex point coordinate information required by the drawing engine 33, address information for texture or MIP mapping texture or control information, such as pixel interleaving, to the drawing engine 33.

The drawing engine 33 receives data from the pre-processor 32 to read out the necessary texture data from the texture cache 33P to generate data in order to write the generated pixel data in the frame buffer 18. The texture cache 33D reads out texture data of a texture area corresponding to the necessary texture addresses calculated by pre-processing in the pre-processor 32 from the frame buffer 18. The texture data is read out so that data readout will be completed before start of picture drawing employing the texture data. The number of times of accessing to the texture area can be decreased by reading only the texture data corresponding to the resolution required for MIP mapping from the texture area.

Figure 4:
FIG. 4 shows an example of a data structure in a texture cache in the GPU.

The data structure in the texture cache 33F, shown as an example in FIG. 4, is comprised of a tag area TAG made up of texture addresses, a storage area DATA having stored therein the necessary texture data and a flag L specifying that the texture data has not as yet been used. For employing the entry, having the flag L reset, the texture cache 33F reads in the texture data from the texture area of the frame buffer 18 to set its flag L. The drawing engine 33 reads out the corresponding texture data from the entry, the flag of which has been set, in order to perform drawing processing, and resets the flag 1 of the entry at a stage in which the drawing has come to a close and hence the texture data is no longer required.

In the drawing device, in which the texture mapping processing is carried out as described above, the pre-processor 32 and the drawing engine 33 are constructed as a pipeline such that the texture data required by the drawing engine 33 are sent from the texture memory, that is the texture area on the frame buffer 18, to the cache memory 33F at a pre-proceeding stage by the pre-processor 32, so that the drawing processing can be carried out without stopping the drawing engine 33. In addition, by reading only the texture data associated with the resolution required for MIP mapping from the texture area, the number of times of accessing to the texture area can be diminished to raise the drawing speed of the entire device.

Figure 5:
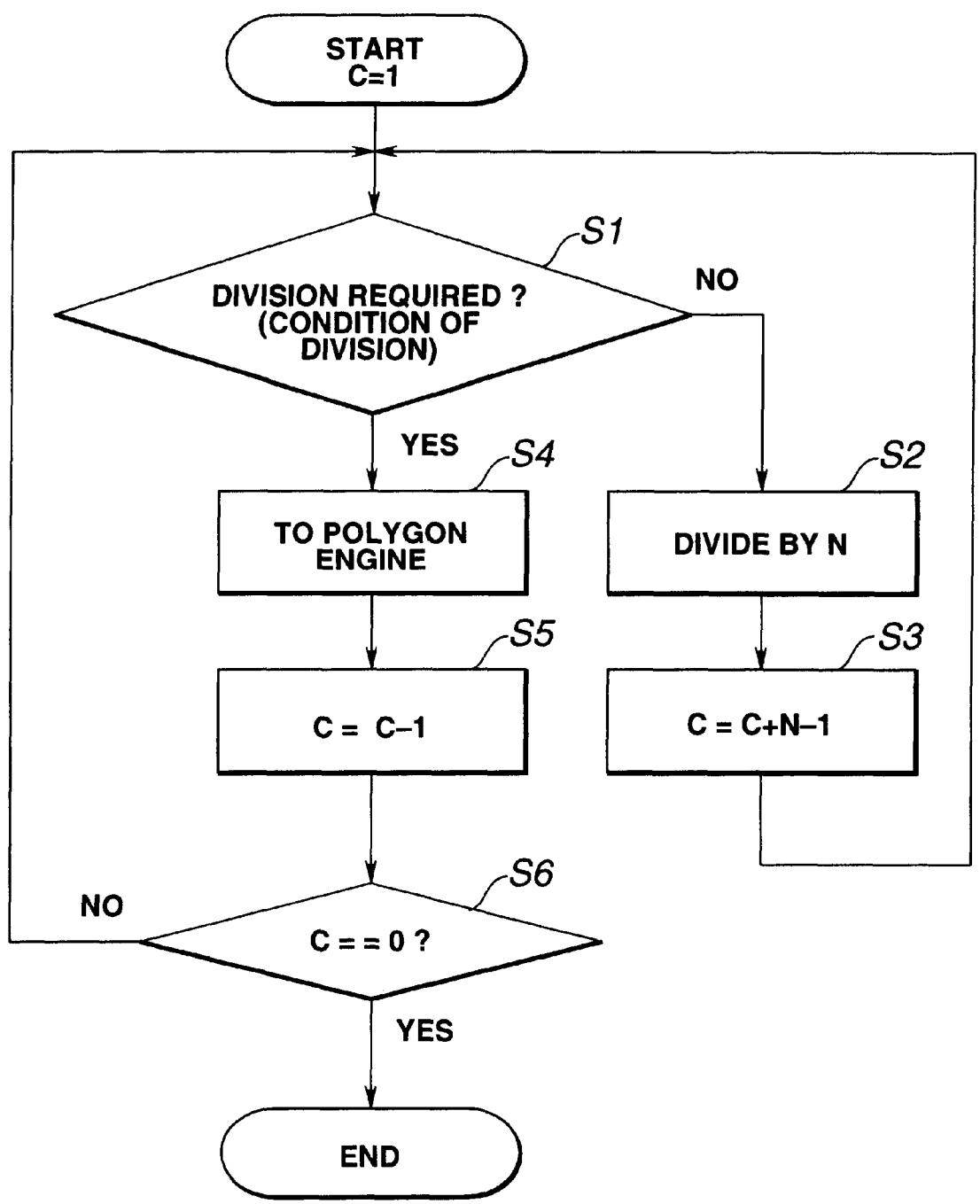
FIG. 5 is a flowchart showing the processing of resolving a first polygon by a pre-processor in the GPU.

The polygon division processing by the pre-processor 32 is carried out in accordance with a flowchart shown in FIG. 5.

Specifically, the polygon division processing is started with the polygon count C specifying the number of polygons set to 1.

At a first processing step S1, it is judged whether or not it is necessary to divide a polygon. In the judgment processing in the processing step S1, it is judged whether or not the polygon now processed is comprised within the range of the texture cache 33F. For this judgment processing, it suffices if calculated values of texture coordinates [(U0, V0), (U1, V1), (U2, V2)] of the apex points of the polygon are within one texture page.

If the result of judgment at the processing step S1 is NO, that is if the polygon needs to be divided, processing transfers to step S2 to perform polygon division by N. Such division by N of the polygon at this processing step S2 is carried out by dividing all sides of the polygon at neutral points, as shown below:

X0'=(X0+X1)/2
Y0'=(Y0+Y1)/2
Z0'=(Z0+Z1)/2
X1'=(X1+X2)/2
Y1'=(Y1+Y2)/2
Z1'=(Z1+Z2)/2
X2'=(X2+X0)/2
Y2'=(Y2+Y0)/2
Z2'=(Z2+Z0)/2
U0'=(U0+U1)/2
V0'=(V0+V1)/2
Z0'=(Z0+Z1)/2
U1'=(U1+U2)/2
V1'=(V1+V2)/2
Z1'=(Z1+Z2)/2
U2'=(U2+U0)/2
V2'=(V2+V0)/2
Z2'=(Z2+Z0)/2
R0'=(R0+R1)/2
G0'=(G0+G1)/2
B0'=(B0+B1)/2

R1'=(R1+R2)/2
G1'=(G1+G2)/2
B1'=(B1+B2)/2
R2'=(R2+R0)/2
G2'=(G2+G0)/2
B2'=(B2+B0)/2

That is, in the division by N of the polygon in the processing step S2, all sides of the polygon are divided at middle points thereof for dividing a triangular polygon, for example, into new polygons with N=4.

At the next processing step S2, the number of polygons is changed by setting the polygon count C to C=C+N−1. Processing then reverts to the first processing step S1 in order to judge whether or not the new as-divided polygons should be sub-divided further. The processing steps S1 to S3 are repeatedly carried out until the new as-divided polygons are comprised within the range of the texture cache.

If the result of decision at the first processing step S1 is YES, that is if there is no necessity of dividing the polygon, processing transfers to the next processing step S4.

At this processing step S4, the pre-processing information for one polygon is handed over to the polygon engines 33A1, 33A2, . . . , 33AN to start rendering processing. Then, processing transfers to the next processing step S5 without waiting for the end of the rendering processing.

At this processing step S5, the polygon count C is decremented.

At the next processing step S6, it is judged whether or not the polygon count C is equal to '0'. If the result of processing at this next processing step S6 is NO, with C≠0, with there being a polygon for processing, processing reverts to the first processing step S1 to enter into the processing of the next polygon. If the result of processing at this next processing step S6 is YES, that is if all polygons have been rendered such that there is no polygon for division, processing comes to a close.

That is, the pre-processor 32 judges whether or not the polygon now processed in the drawing engine 33 is comprised within the texture cache 33F (judgment condition 1). The pre-processor 32 performs division processing based on the results of judgment for dividing the polygon corresponding to the drawing command so that the new as-divided polygons will be comprised within the texture cache 33F. This enables texture mapping processing to be performed reliably and efficiently based on the texture data read out in the drawing engine 33 from the texture cache 33f via the CLUT cache 33G.

In the division processing of the polygon by the pre-processor 32, it is possible to check in the above-mentioned first processing step whether or not the number of pixels in the polygon is smaller than a prescribed value (judgment condition 2) for checking whether or not the polygon needs to be divided and to divide the polygon corresponding to the drawing command into plural polygons in a two-dimensional space at the processing step S2 so that the number of pixels in the new as-split polygons will be not larger than the prescribed value. In this manner, the size of the polygon to be processed by the drawing engine can be equated. The number of pixels in the polygon can also be judged by finding the area as an outer product value of the apex points of the polygon and by checking whether or not the value is smaller than an optimum value.

In the division processing of the polygon by the pre-processor 32, the polygon corresponding to the drawing command can be divided into plural polygons in a three-dimensional space at the above-mentioned processing step S2.

In this case, it is possible to judge at the first processing step S1 whether or not the difference between the minimum value and the maximum value of the Z-value of the apex point of the polygon is comprised within an optimum range (judgment condition 3) in order to check whether or not the polygon needs to be divided and to divide the polygon corresponding to the drawing command at the processing step S2 into plural polygons in the three-dimensional space so that the number of pixels in the new as-divided polygons will be comprised within the prescribed range for limiting the size of the polygon for executing texture mapping processing in a state with only little texture distortion on the basis of texture data read out from the texture cache 33F via the CLUT cache 33G.

In this case, it is possible to judge at the first processing step S1 whether or not the MIP map texture referred to by the minimum and maximum values of the Z-values of the apex points of the polygon is traversed (judgment condition 4) and, based on the results of judgement, to divide the polygon corresponding to the drawing command at the processing step S2 into plural polygons in a three-dimensional space for limiting the range of reference of the MIP mapping referred to in a polygon for efficient MIP mapping based on the MIP map texture data read out from the texture cache 33F via the CLUT cache 33G.

It is also possible to judge whether or not the polygon needs to be divided depending on whether or not the number of pixels in a polygon is not more than a pre-set value and to divide the polygon corresponding to the drawing command is not larger than the prescribed value and to divide the polygon corresponding to the drawing command into plural polygons at the processing step S2 in the three-dimensional space.

It is similarly possible to predict the drawing processing time for the drawing engine 33 based on, for example, the number of pixels in the polygon, judge whether or not the polygon needs to be divided based on whether the pre-processing time by the pre-processor 32 is balanced to the drawing processing time by the drawing engine 33, at the processing step S1 (judgment condition 5) and to divide the polygon corresponding to the drawing command at the processing step S2 based on the result of judgment so that the pre-processing time by the pre-processor 32 is balanced to the drawing processing time by the drawing engine 33. This renders it possible to balance the processing time by the pre-processor 32 and that by the drawing engine 33 relative to each other and to construct the pre-processor 32 and the drawing engine 33 by pipelining to realize high-speed drawing efficiently.

It is also possible to judge at the processing step S1 whether or not the shape of the polygon processed by the processing engine 33 is suited pixel interleaving (judgment condition 6) at the above-mentioned processing step S1 and to divide the polygon corresponding to the drawing command by the processing step S2 into plural new polygons having the shape suitable for the pixel interleaving. This renders it possible to access the frame buffer 18 efficiently by the drawing engine 33 to effect high-speed drawing processing.

It is likewise possible to judge at the processing step S1 whether or not, based on the combination of the above-mentioned various judgment conditions, the polygon needs to be divided, and to divide the polygon corresponding to the drawing command by the processing step S2 into plural new polygons so that the new as-divided polygons meet the judgment conditions.

Specifically, it is possible to judge at the processing step S1 whether or not, based on the combination of the judgment conditions 1 and 2, the polygon needs to be divided, and to divide the polygon corresponding to the drawing command by the processing step S2 into plural new polygons so that the new as-divided polygons meet the judgment conditions 1 and 2 in order to equate the size of the polygons processed by the drawing engine 33 and in order to carry out the texture mapping processing reliably and efficiently based on the texture data read out from the texture cache 3F via CLUT cache 33G.

It is also possible to judge at the processing step S1 whether or not, based on the combination of the judgment conditions 1 and 3, the polygon needs to be divided, and to divide the polygon corresponding to the drawing command by the processing step S2 into plural new polygons so that the new as-divided polygons meet the judgment conditions 1 and 3. This renders it possible to perform texture mapping processing reliably and efficiently with only little texture distortion based on texture data read out from the texture cache 33F via CLUT cache 33G. Also, if the judgment condition 2 is combined with the above combination, the size of the polygon processed by the drawing engine 33, that is the number of pixels, can be equated in order to carry ut texture mapping.

It is also possible to judge at the processing step S1 whether or not, based on the combination of the judgment conditions 1 and 4, the polygon needs to be divided, and to divide the polygon corresponding to the drawing command by the processing step S2 into plural new polygons so that the new as-divided polygons meet the judgment conditions 1 and 4. This renders it possible to perform MIP mapping processing reliably and efficiently based on texture data read out from the texture cache 33F via CLUT cache 33G. Also, if the judgment conditions 2 and 3 are combined with the above combination, it becomes possible to equate the size of the polygon processed by the drawing engine 33, that is the number of pixels, and to diminish texture distortion.

It is also possible to judge at the processing step S1 whether or not, based on the combination of the judgment conditions 1 and 5, the polygon needs to be divided, and to divide the polygon corresponding to the drawing command by the processing step S2 into plural new polygons so that the new as-divided polygons meet the judgment conditions 1 and 5. This renders it possible to keep the processing time by the pre-processor 32 balanced with that by the drawing engine 33 to effect efficient high-speed texture mapping by pipelining. Also, if the judgment conditions 2 and 3 are combined with the above combination, it becomes possible to equate the size of the polygon processed by the drawing engine 33, that is the number of pixels, and to diminish texture distortion. The judgment condition 4 may also be combined with the above combination to effect MIP mapping.

It is also possible to judge at the processing step S1 whether or not, based on the combination of the judgment conditions 1 and 6, the polygon needs to be divided, and to divide the polygon corresponding to the drawing command by the processing step S2 into plural new polygons so that the new as-divided polygons meet the judgment conditions 1 and 6. This renders it possible to effect texture mapping reliably and efficiently by the drawing engine 33 and to access the frame buffer 18 efficiently to realize high-speed drawing. Also, if the judgment conditions 2 and 3 are combined with the above combination, it becomes possible to equate the size of the polygon processed by the drawing engine 33, that is the number of pixels, and to diminish texture distortion. The judgment condition 4 may also be combined with the above combination to effect MIP mapping or the judgment condition 5 may be combined with the above combination to effect high-speed processing by pipelining.

Figure 6:
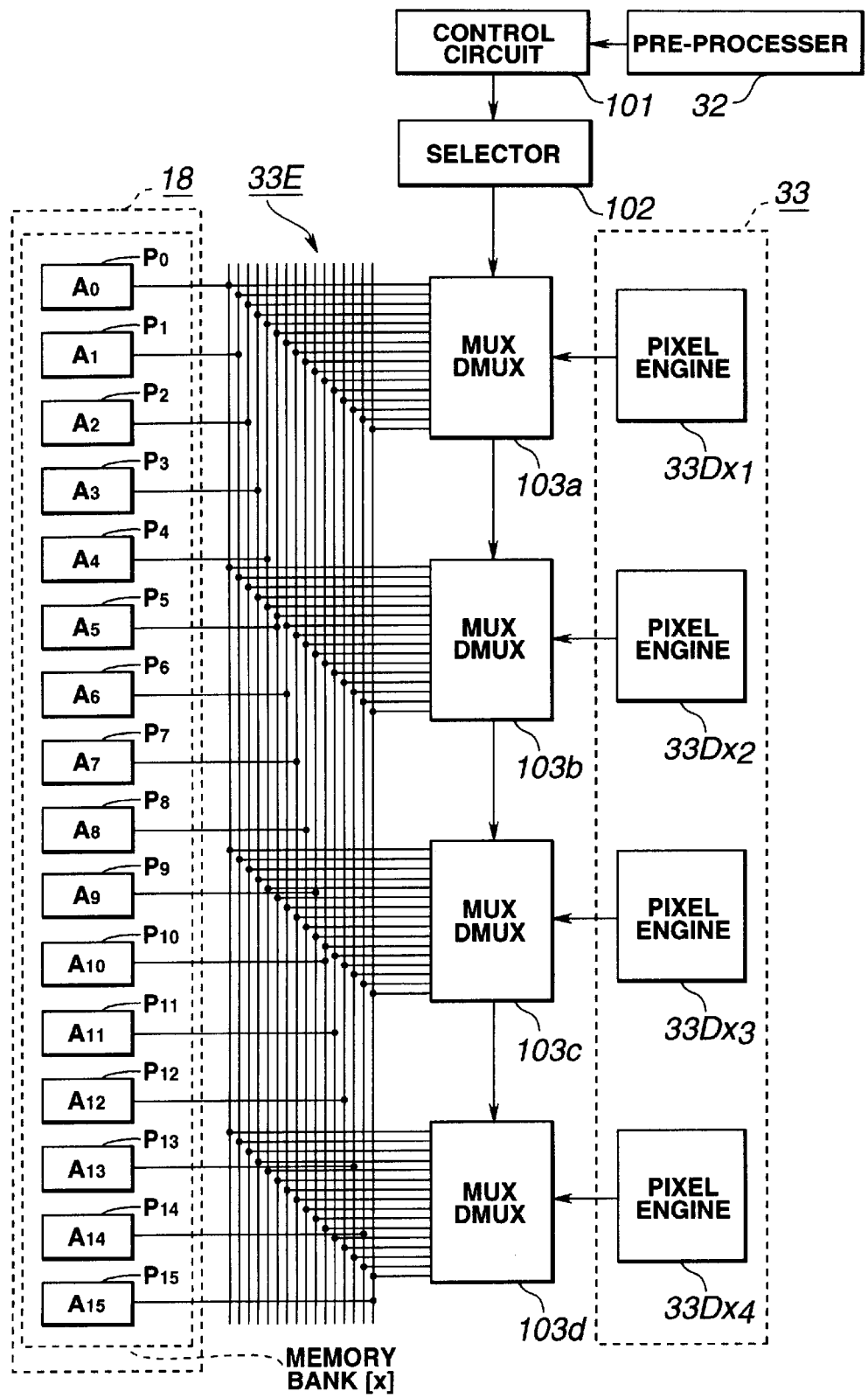
FIG. 6 is a block diagram showing the structure of a second bus switcher in the video game machine.

The pixel interleaving by the above-mentioned second bus switcher 33E is carried out as described below:

Referring to FIG. 6, the second bus switcher 33E includes a control circuit 101 fed with an output of the pre-processor 32 shown in FIG. 2, a selector 102 fed with an output of the control circuit 101 and plural multiplexer/demultiplexers (MUX/DMUX) 103a, 103b, 103c, 103d, . . . each fed with an output of the selector 102.

The MUX/DMUX 103a, 103b, 103c, 103d, . . . are connected to the frame buffer 18 and to the drawing engine 33 shown in FIG. 2.

The frame buffer 18 is made up of plural memory banks [1], [2], . . . , [X], . . . , [L], as shown in FIG. 2. Each of the memory banks [1], [2], . . . , [X], . . . , [L] is made up of a rectangular area represented by 16 addresses (interleaving patterns), so that the 16 addresses can be accessed simultaneously.

Therefore, the memory bank [X], for example, of the frame buffer 18, has 16 input/output ports $P_0$ to $P_{15}$ for accessing the addresses $A_0$ to $A_{15}$. Of the MUX/DMUX 103a, 103b, 103c, 103d, . . . , the four MUX/DMUX 103a, 103b, 103c, 103d are each connected to 16 input/output ports $P_0$ to $P_{15}$.

Also, the four MUX/DMUX 103a, 103b, 103c, 103d are connected in association with four pixel engines $33D_{x1}$, $33D_{x2}$, $33D_{x3}$ and $33D_{x4}$ of the drawing engine 33.

Since the memory banks other than the memory bank [X] are configured similarly to the above-mentioned memory bank [X], the detailed description therefor is not made for simplicity. The accessing operation performed by the second bus switcher 33E on the other memory banks is similar to that performed by the second bus switcher 33E on the memory bank [X] as later explained. Therefore, in the following description, only the accessing operation performed by the second bus switcher 33E on the memory bank [X] is explained.

First, a series of operations by the second bus switcher 33E is explained.

Figure 7:
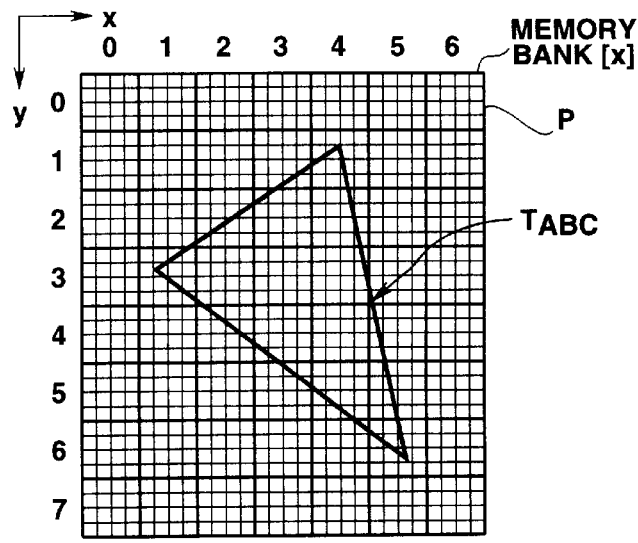
FIG. 7 illustrates the structure of a second bus switcher in the video game machine.

If, for example, the shape of a polygon drawn on the memory bank [X] is a triangle $T_{ABC}$ (the shape of the first polygon) as shown in FIG. 7, the control circuit 101 is first fed from the pre-processor 32 with the pixel interleaving control information. Based on the pixel interleaving control information from the pre-processor 32, the control circuit 101 changes over an interleaving pattern, used for accessing the inside of the triangle $T_{ABC}$, to, for example, a (4×4) interleaving pattern.

The method for changing over the interleaving pattern in the control circuit 101 will be later explained in detail.

Of plural interleaving patterns formed on the memory bank [X], such interleaving pattern to be accessed, that is, such interleaving pattern as permits the inside of the triangle $T_{ABC}$ to be accessed in its entirety, is detected by the control circuit 101, with the aid of the (4×4) interleaving pattern.

Figure 8:
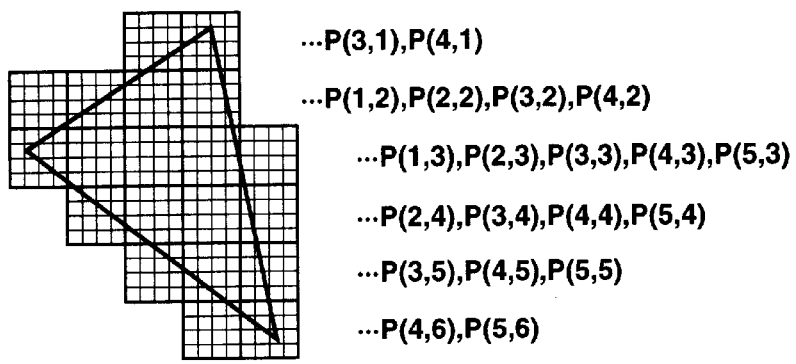
FIG. 8 illustrates an interleaving pattern to be accessed when having access to the inside of the shape of the first polygon.

Thus, in the triangle $T_{ABC}$, if each interleaving pattern on the memory bank [X] is indicated by P (pattern index in the x-direction and pattern index in the y-direction), a sum total of 20 interleaving patterns specified by $$P(x, y) = P(3, 1), P(4, 1), P(1, 2),$$
$$P(2, 2), P(3, 2), P(4, 2),$$
$$P(1, 3), P(2, 3), P(3, 3),$$
$$P(4, 3), P(5, 3), P(2, 4),$$
$$P(3, 4), P(4, 4), P(5, 4),$$
$$P(3, 5), P(4, 5), P(5, 5),$$
$$P(4, 6), P(5, 6)$$

are detected, as shown in FIG. 8.

The control circuit 101 routes the pattern information specifying the 20 interleaving patterns, detected as described above, to the selector 102 on the interleaving pattern basis. When performing memory accessing on the address basis, the control circuit 101 routes the mask information corresponding to the shape of the triangle $T_{ABC}$ to the selector 102.

Based on the pattern information, supplied from the control circuit 101 on the interleaving patten basis, the selector 102 designates the address corresponding to the (4×4) interleaving pattern P to be accessed for the MUX/DMUX 103a, 103b, 103c and 103d.

Figure 9:
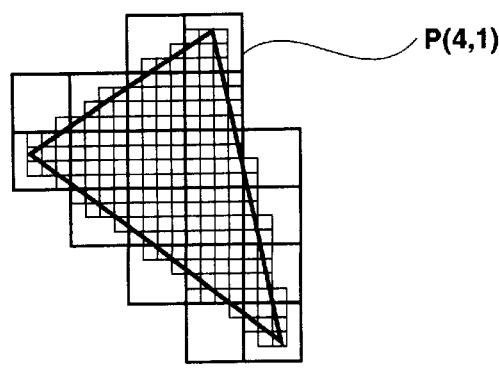
FIG. 9 illustrates masking in case of for address-based accessing when having access to the inside of the shape of the first polygon.
Figure 10:
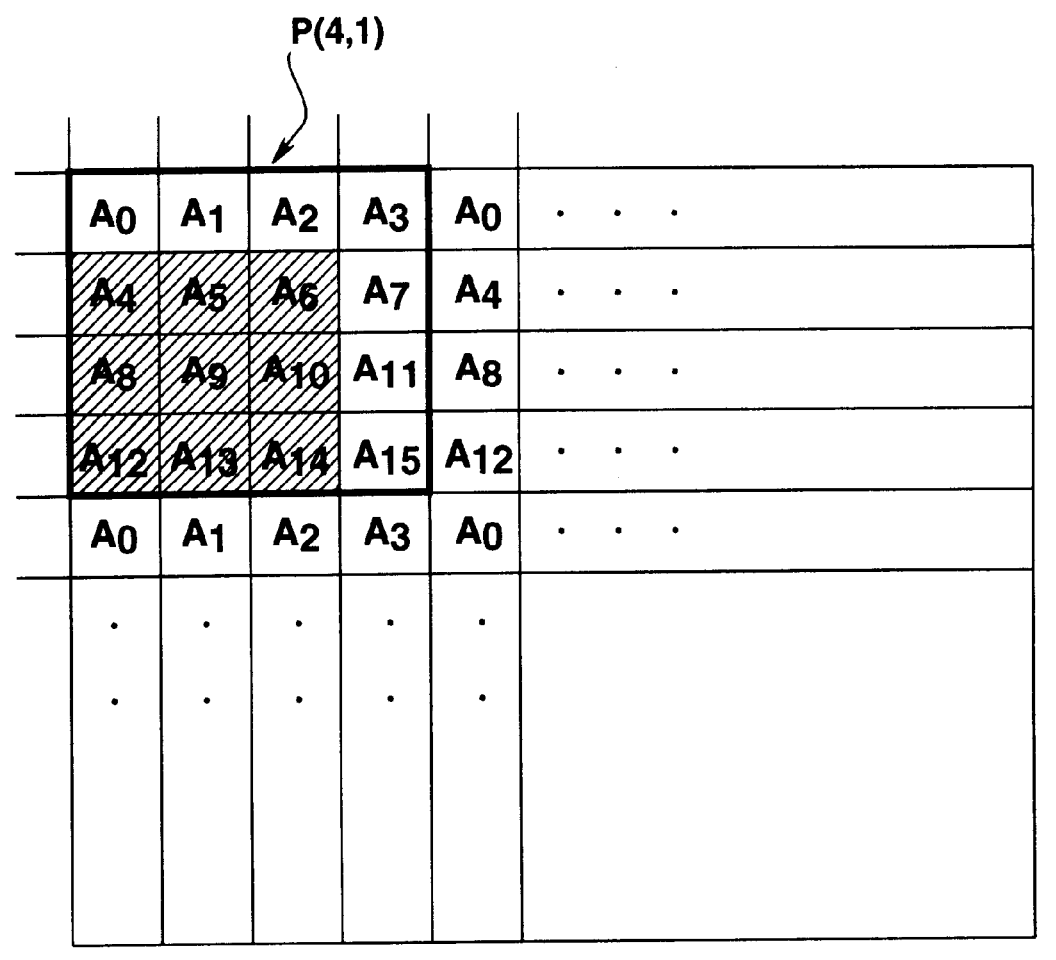

If fed with the mask information from the control circuit 101, the selector 102 designates for MUX/DMUX 111103a to 103d the accessing addresses obtained as a result of masking performed in the (4×4) interleaving patterns P, on the basis of the masking information, as shown in FIG. 9. Thus, of the addresses $A_0$ to A in the interleaving pattern specified by P(4,1) shown in FIG. 9, the addresses to be accessed, obtained as the result of masking, are A4, A5, A6, A8, A9, A10, A13, A14 and A15, shown shaded in FIG. 10.

The MUX/DMUX 103a, 103b, 103c and 103d access the addressees $A_0$ to $A_{15}$ on the memory bank [X] designated by the selector 102.

The pixel engines $33D_{x1}$, $33D_{x2}$, $33D_{x3}$ and $33D_{x4}$ output pixel data to the MUX/DMUX 103a, 103b, 103c and 103d, respectively, as explained previously.

Thus the MUX/DMUX 103a accesses the address designated by the selector 102 to write pixel data from the pixel engine Xa, via one of the input/output ports $P_0$ to $P_{15}$ corresponding to the address designated by the selector 102, in an area on the memory bank [X] designated by the above address.

The MUX/DMUX 103a accesses the address designated by the selector 102 to read out data written in an area designated by the address on the memory bank [X] via one of the input/output ports $P_0$ to $P_{15}$ corresponding to the above address. The MUX/DMUX 103a performs pre-set processing on the data read out from the memory bank [X].

Since the operation of the MUX/DMUX 103b to 103d is similar to the above-described operation of the MUX/DMUX 103a, detailed description therefor is omitted for clarity.

The method for changing over the interleaving patterns in the above-described control circuit 101 is now specifically explained.

Figure 11:
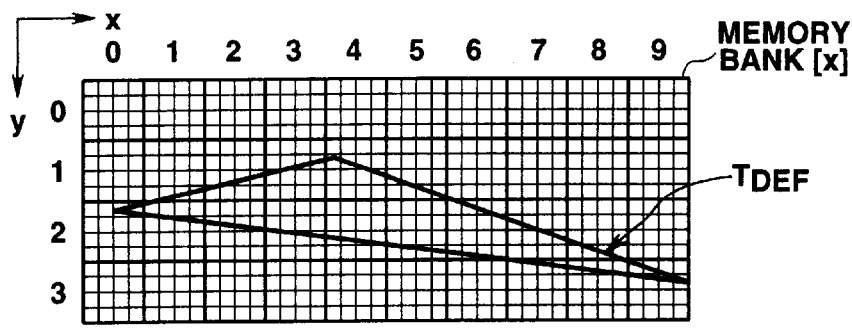
FIG. 11 illustrates accessing to the inside of the shape of the second polygon drawn on a memory bank of the frame buffer with a (4×4) interleaving pattern.

First, the number of times of accessing the inside of a transversely elongated triangle $T_{DEF}$ (shape of a second polygon) as the shape of a polygon drawn on the memory bank [X] shown in FIG. 11 with a (4×4) interleaving pattern P is explained.

Figure 12:
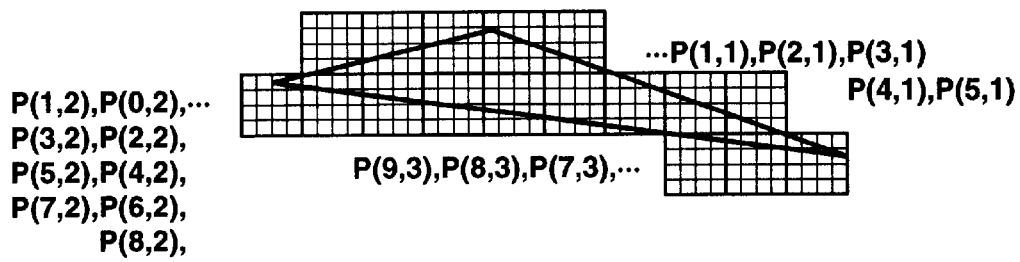
FIG. 12 illustrates an interleaving pattern to be accessed when accessing to the inside of the shape of the second polygon drawn on a memory bank of the frame buffer with a (4×4) interleaving pattern.

In this case, the interleaving patterns to be accessed are:

$$P(x, y) = P(1, 1), P(2, 1), P(3, 1),$$
$$P(4, 1), P(5, 1), P(0, 2),$$
$$P(1, 2), P(2, 2), P(3, 2),$$
$$P(4, 2), P(5, 2), P(6, 2),$$
$$P(7, 2), P(8, 2), P(7, 3),$$
$$P(8, 3), P(9, 3),$$

totaling at 17, as shown in FIG. 12.

That is, for accessing the inside of the triangle $T_{DEF}$ with the (4×4) interleaving pattern, the number of times of accessing for accessing the inside of the triangle $T_{DEF}$ in its entirety is 17.

Figure 13:
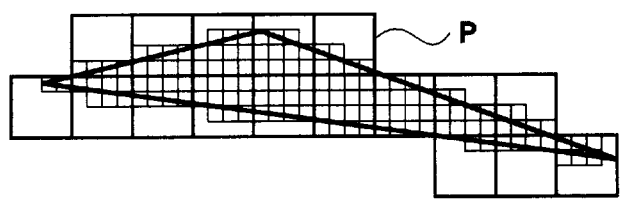
FIG. 13 illustrates masking in case of address-based accessing to the inside of the shape of the second polygon with a (4×4) interleaving pattern.

In case of accessing on the address basis, only the required memory addresses can be accessed by carrying out the masking in the (4×4) interleaving pattern P, as in case of accessing the above-mentioned triangle $T_{ABC}$, as shown in FIG. 13.

Figure 14:
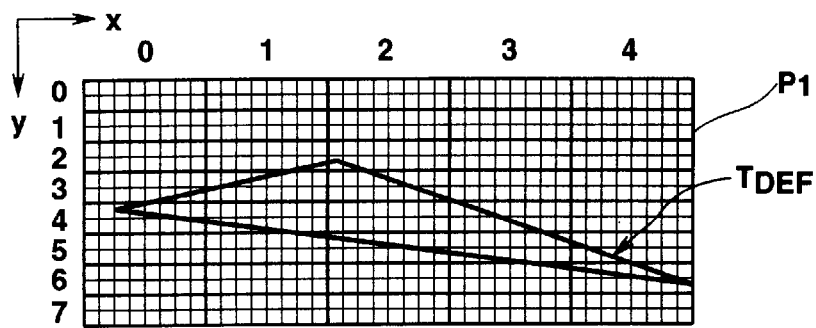
FIG. 14 illustrates the inside of the second polygon with a (8×2) interleaving pattern.
Figure 15:
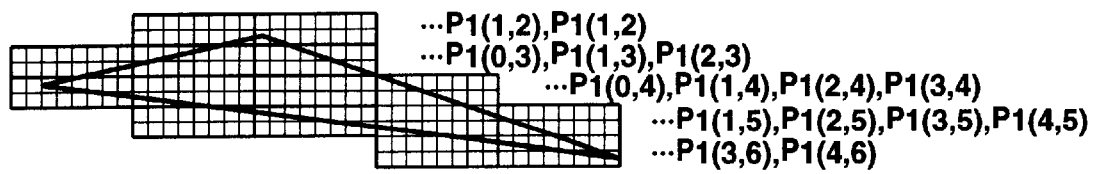
FIG. 15 illustrates an interleaving pattern to be accessed when accessing to the inside of the shape of the second polygon drawn on a memory bank of the frame buffer with a (8×2) interleaving pattern.

Then, if the inside of the triangle $T_{DEF}$ is accessed with a (8×2) interleaving pattern $P_1$ as shown in FIG. 14, the interleaving patterns to be accessed are $$P_1(x, y) = P_1(1, 2), P_1(2, 2),$$
$$P_1(0, 3), P_1(1, 3),$$
$$P_1(2, 3), P_1(0, 4),$$
$$P_1(1, 4), P_1(2, 4),$$
$$P_1(3, 4), P_1(1, 5),$$
$$P_1(2, 5), P_1(3, 5),$$
$$P_1(4, 5), P_1(3, 6),$$
$$P_1(4, 6)$$

totaling at 15, as shown in FIG. 15.

That is, if the inside of the triangle $T_{DEF}$ is accessed with the (8×2) interleaving pattern, the number of times of accessing required for accessing the entire inside of the triangle $T_{DEF}$ is 15.

Figure 16:
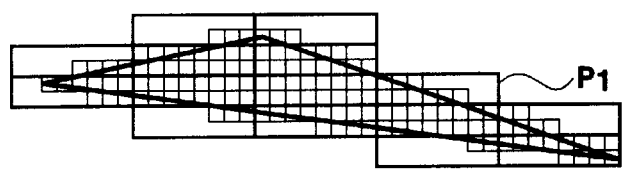
FIG. 16 illustrates masking in case of address-based accessing to the inside of the shape of the second polygon with a (8×2) interleaving pattern.

In case of accessing on the address basis, masking is performed within the (8×2) interleaving pattern $P_1$ as in case of accessing the triangle $T_{ABC}$ as described above, as shown in FIG. 16, for accessing only the needed memory address.

Figure 17:
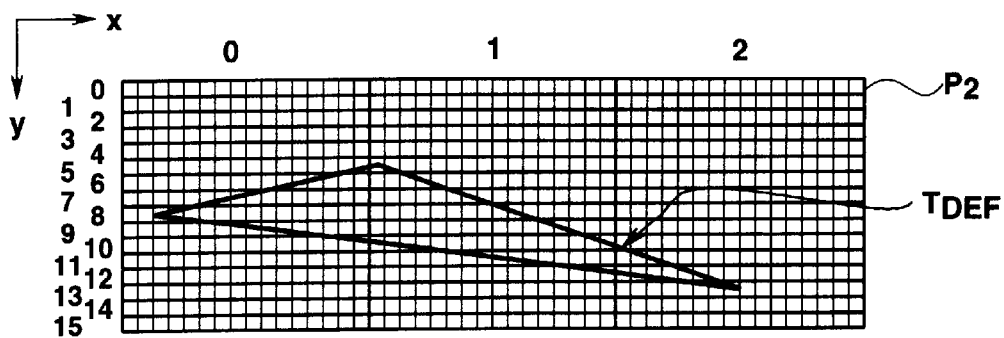
FIG. 17 illustrates the inside of the second polygon with a (16×1) interleaving pattern.

Then, if the inside of the triangle $T_{DEF}$ is accessed with a (16×1) interleaving pattern $P_2$, as shown in FIG. 17, the interleaving patterns to be accessed are $$P_2(x, y) = P_2(0, 5), P_2(1, 5),$$
$$P_2(0, 6), P_2(1, 6),$$
$$P_2(0, 7), P_2(1, 7),$$
$$P_2(0, 8), P_2(1, 8),$$
$$P_2(0, 9), P_2(1, 9),$$
$$P_2(0, 10), P_2(1, 10),$$

Figure 18:
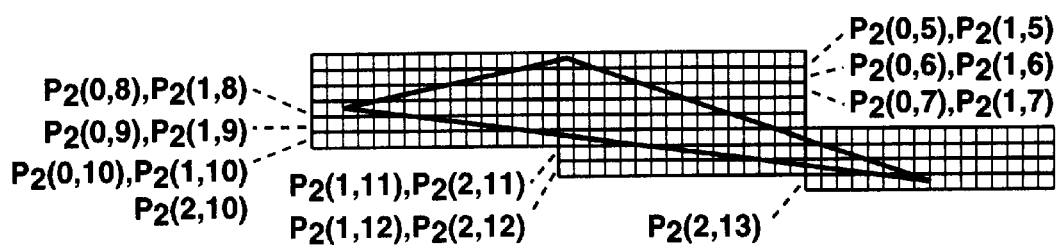
FIG. 18 illustrates an interleaving pattern to be accessed when accessing to the inside of the shape of the second polygon drawn on a memory bank of the frame buffer with a (16×1) interleaving pattern.

-continued $P_2(2, 10), P_2(1, 11),$ $P_2(2, 11), P_2(1, 12),$ $P_2(2, 12), P_2(2, 13)$ totaling at 18, as shown in FIG. 18.

That is, if the inside of the triangle $T_{DEF}$ is accessed with the (16×1) interleaving pattern, the number of times of accessing required for accessing the entire inside of the triangle $T_{DEF}$ is 18.

Figure 19:
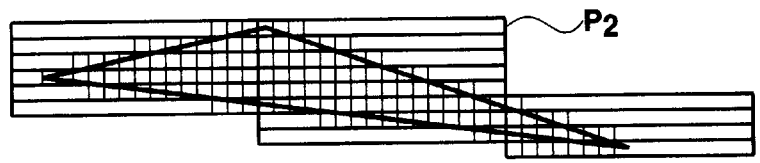
FIG. 19 illustrates masking in case of address-based accessing to the inside of the shape of the second polygon with a (16×1) interleaving pattern.

In case of accessing on the address basis, masking is performed within the (8×2) interleaving pattern $P_2$ as in case of accessing the triangle $T_{ABC}$ as described above, as shown in FIG. 19, for accessing only the needed memory address.

As described above, the number of times of accessing the inside of the triangle $T_{DEF}$ with the (4×4) interleaving pattern P is 17, while that of accessing the inside of the triangle $T_{DEF}$ with the (8×2) interleaving pattern $P_1$ is 15 and that of accessing the inside of the triangle $T_{DEF}$ with the (16×1) interleaving pattern $P_2$ is 18. Thus, the number of times of accessing the inside of the triangle $T_{DEF}$ with the (8×2) interleaving pattern $P_1$ represents the minimum number of times of accessing. Thus it is seen that a proper interleaving pattern for the triangle $T_{DEF}$ is the (8×2) interleaving pattern $P_1$.

Thus, for switching the interleaving pattern used for accessing the memory bank [X] to a proper interleaving pattern in meeting with the shape of the polygon to be accessed, the control circuit 101 executes the following processing operations.

Figure 20:
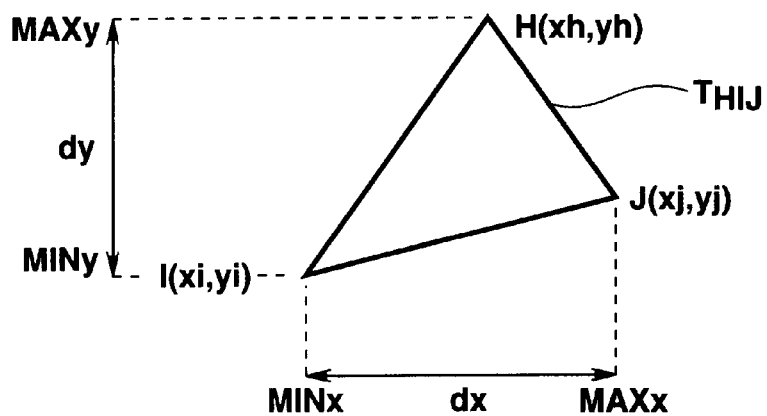
FIG. 20 illustrates processing for calculating the aspect ratio of a polygon drawn on a memory bank of the frame buffer.

If, for example, the shape of a polygon drawn on the memory bank [X] is a triangle $T_{HIJ}$, as shown in FIG. 20, the control information for pixel interleaving is supplied from the pre-processor 32 to the control circuit 101, as described above. For example, the control information for pixel interleaving is such information as xy coordinates H (Xh, Yh), I (Xi, Yi) or J (Xj, Yj) of three apex points of the triangle $T_{HIJ}$.

The control circuit 101 then finds, using the control information for pixel interleaving from the pre-processor 32, the aspect ratio R of the triangle $T_{HIJ}$, by calculations:

$$R = dy/dx$$
$$= (MAXy - MINy)/(MAXx - MINx)$$

where MAXx and MINx are maximum and minimum values in the X-direction, respectively, and MAXy and MINy are maximum and minimum values in the Y-direction, respectively, as shown in FIG. 20.

In the triangle $T_{HIJ}$,

MAXx=Xj

MINx=Xi

MAXy=Yh

MINy=Yi

Figure 21:
FIG. 21 is a pattern diagram showing five sorts of interleaving patterns having 16 addresses.
Figure 21:
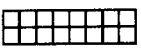
Figure 21:
Figure 21:
Figure 21:

Depending on the aspect ratio R, thus found, the control circuit 101 selects one of five interleaving patterns Pa to Pe of (1×16), (2×8), (4×4), (8×2) and (16×1), as shown in FIG. 21, and switches the interleaving pattern used in accessing the inside of the triangle $T_{HIJ}$ to the selected interleaving pattern.

The control circuit 101 has a table for the aspect ratio R and interleaving patterns (Table 1). In this table are pre-set proper interleaving patterns associated with various values of the aspect ratio R, that is such an interleaving pattern as minimizes the number of times of accessing. Thus the control circuit 101 selects, using the above table, a proper interleaving pattern associated with the aspect ratio R found as described above.

TABLE 1

| aspect ratio R | interleaving pattern |
|---|---|
| ~ 0.1 | Pa (16 × 1) |
| 0.1 ~ 0.5 | Pb (8 × 2) |
| 0.5 ~ 2.0 | Pc (4 × 4) |
| 2.0 ~ 8.0 | Pd (2 × 8) |
| 8.0 ~ | Pe (1 × 16) |

In the second bus switcher 33E, a proper one of five interleaving patterns Pa to Pe shown in FIG. 21 is selected responsive to the shape of the polygon to be drawn on the memory bank [X], which is then accessed with the selected interleaving pattern, so that the polygon can be drawn on the memory bank [X] with the minimum number of accessing operations. Thus it is possible for the second bus switcher 33E to effect memory accessing efficiently.

The GPU 15 accesses the frame buffer 18 by the second bus switcher 33E aimed at raising the memory accessing efficiency, for performing various data processing operations, as described above, for realizing efficient data processing operations.

Figure 22:
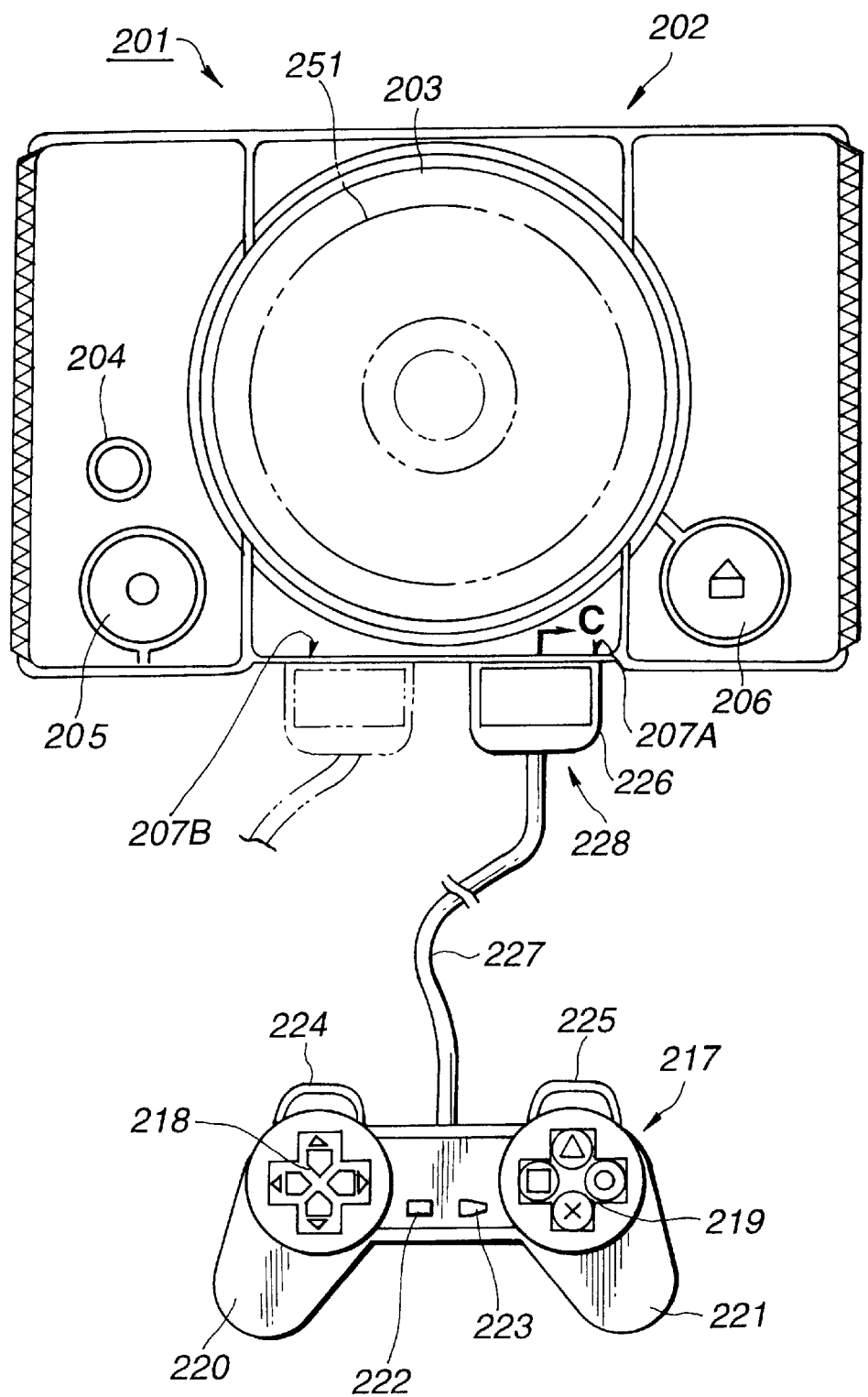
FIG. 22 is a plan view of a video game device embodying the present invention.
Figure 23:
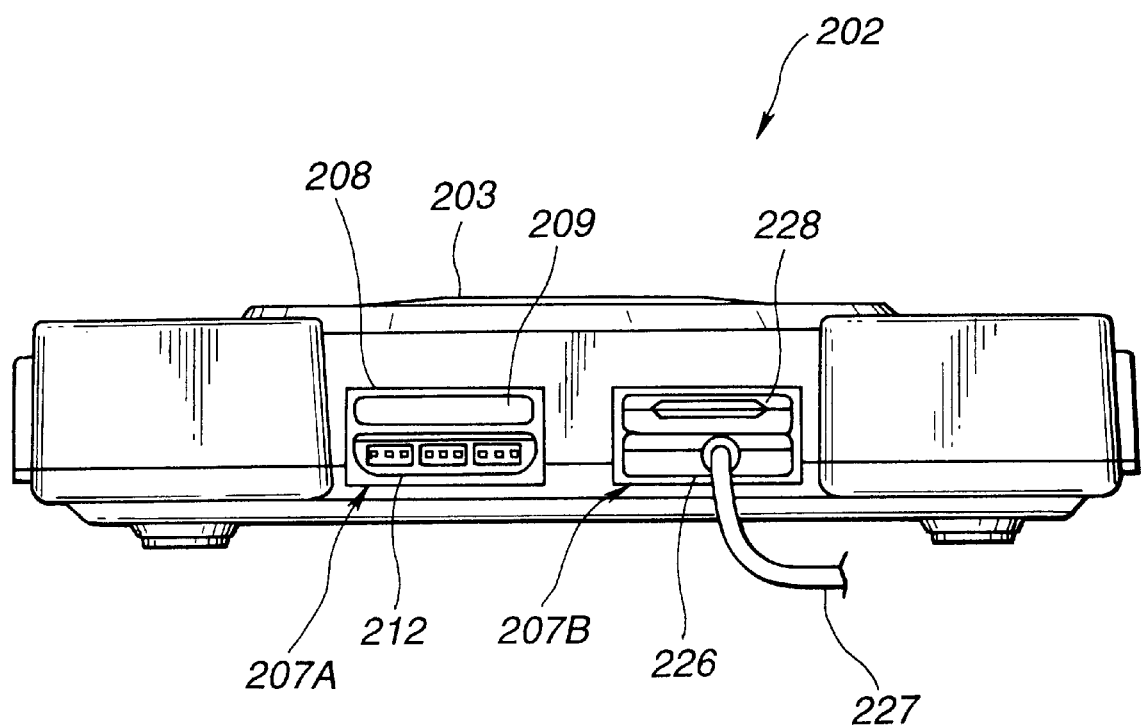
FIG. 23 is a back-side view of the video game device.
Figure 24:
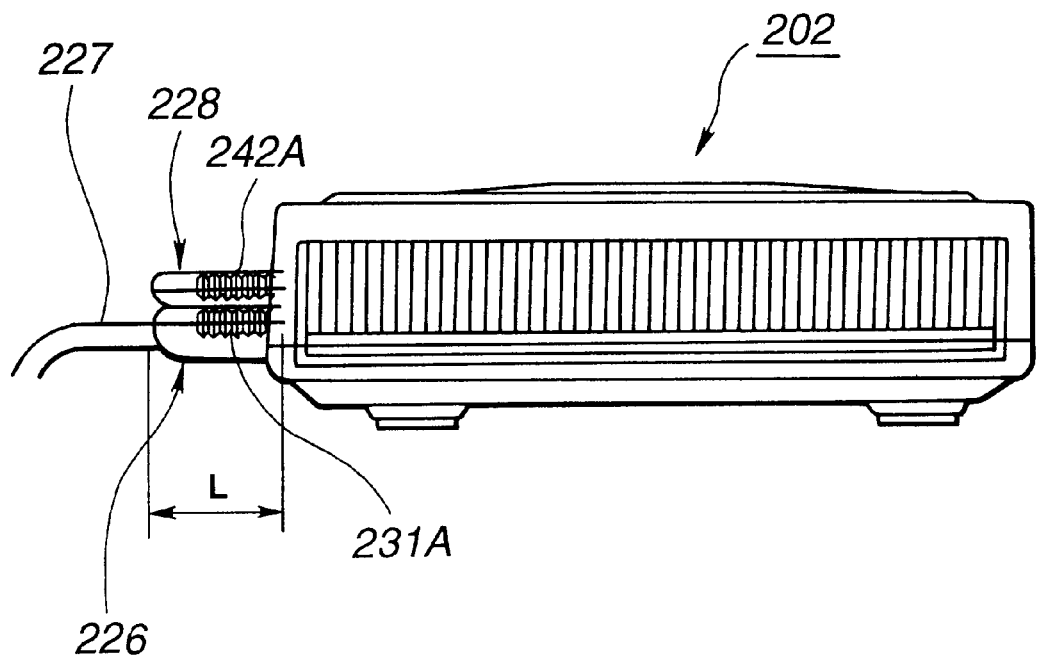
FIG. 24 is a side view of the video game device.

A video game machine 201 embodying the present invention is configured as shown for example in a plan view of FIG. 22, a front view of FIG. 23 and in a side view of FIG. 24.

Figure 25:
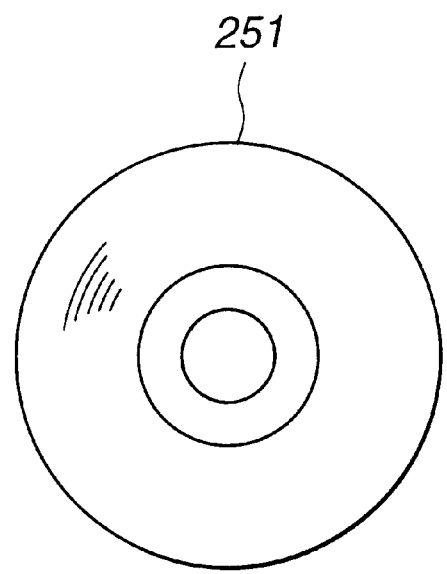
FIG. 25 is a plan view of a CD-RAM loaded on the video game device.

That is, the present video game machine 201 is basically made up of a main body member 202 and an operating device 217 connected to the main body member 202 via a cable 227, as shown in FIG. 22. At a mid portion on the upper surface of the main body member 202 is mounted a disc loading unit 203 within which is loaded a CD-ROM 251 shown in FIG. 25. On the left side of the disc loading unit 203 are mounted a power source switch 205 operated for turning on or off the device and a reset switch 204 operated for transiently resetting the game. On the right side of the disc loading unit 203 is mounted a disc actuating switch 206 operated for mounting or dismounting the CD-ROM 251 with respect to the disc loading unit 203.

On the front side of the main body member 202 are mounted connecting portions 207A, 207B, as shown in FIG. 23. These connecting portions 207A, 207B are provided with a connection terminal 226 provided on the foremast part of the cable 227 derived from the operating device 217 and a connection terminal inserting portion 212 for connecting a recording device 228, such as a memory card, and a recording/inserting portion 208. That is, two each of the operating devices 217 and recording devices 228 can be connected to the main body member 202.

The front view of FIG. 23 shows the state in which the connection terminal portion 226 and the recording device 228 are loaded on the right side connecting portion 207B with none of the connecting terminal portion 226 nor the recording device 228 being loaded on the left side connecting portion 207A. The recording inserting portion 208 for loading the recording device 228 thereon is provided with the shutter 209, as shown in FIG. 23. When loading the recording device 228 on the main body member 202, the shutter 209 is thrust by the foremost part of the recording device 228 to effect loading.

The connecting terminal portion 226 has a knurled gripping part 231A for anti-slip effect. Similarly, the recording device 228 has a knurled gripping part 242A for anti-slip effect. Referring to a side view of FIG. 24, the connecting terminal portion 226 has a length L substantially equal to a length of the recording device 228.

The operating device 27 has supports 220, 221 that can be gripped with left and right hands. The foremost parts of the supports 220, 221 are provided with operating parts 218, 219, respectively. The operating parts 224, 225 are operated with index fingers of both hands, while the operating parts 218, 219 are operated with thumbs of both hands.

Between the operating parts 218 and 219 are provided a select switch 222 that is actuated for selection during the game and a start switch 223 operated for starting the game.

With the present video game machine 201, the CD-ROM 251 loaded on the disc loading unit 203 is reproduced by the CD-ROM driver 30. The operating device 217 is equivalent to the above-mentioned input device 28, while the recording device 228 is equivalent to the auxiliary storage device 27.

What is claimed is:

1. A picture drawing apparatus comprising:

pre-processing means for generating data required for drawing processing prior to drawing processing on a unit figure basis in accordance with a drawing command for drawing a picture model defined by the combination of unit figures, and for identifying texture data necessary for texture mapping the unit figures;

picture drawing means for generating pixel data on the unit figure basis and for reading out said texture data for texture mapping processing responsive to said drawing command for drawing a picture on a picture memory;

storage means for transient storage of only said texture data required by the picture drawing means for texture mapping; and supplying means for supplying the texture data to said storage means required by said picture drawing means for texture mapping responsive to said data outputted by said pre-processing means.

2. The picture drawing device as claimed in claim 1 wherein said picture drawing means has the function of performing MIP mapping, said picture drawing means selecting texture data having the desired resolution responsive to data outputted by said pre-processing means for supplying the selected texture data to said storage means.

3. A picture drawing method comprising the steps of:

generating data pertinent to picture drawing processing on a unit figure basis in accordance with a drawing command for drawing a picture model defined by the combination of unit figures and for identifying texture data necessary for texture mapping the unit figures;

supplying texture data necessary for texture mapping in said picture drawing processing to storage means based on said data;

generating pixel data of a unit figure and reading out only said texture data for texture processing for drawing on a picture memory and drawing a picture on a picture memory.

4. The picture drawing method as claimed in claim 3 wherein said step of supplying said texture data to said storage means includes a step of supplying texture data of resolution required in MIP mapping in said picture drawing processing responsive to data pertinent to said picture drawing processing.

* * * * *

UNITED STATES PATENT AND TRADEMARK OFFICE
CERTIFICATE OF CORRECTION

PATENT NO.    : 6,157,384  
DATED         : December 5, 2000  
INVENTOR(S)   : Masaaki Oka and Toshiyuki Hiroi Page 1 of 1

It is certified that error appears in the above-identified patent and that said Letters Patent is hereby corrected as shown below:

<u>Title page,</u>  
Item [73], Assignee" change "WINX Corporation", to read -- SONY COMPUTER ENTERTAINMENT INC. --.  
Item [57], ASTRACT, line 13, delete "means" and line 14, change "time" to read -- times -- and change "accessing", to read -- accessed --.

<u>Drawings,</u>  
Sheet 4 of 14, FIG. 5, reverse "YES" and "NO" at Sl.

<u>Column 5,</u>  
Line 1, change "CPU", to read -- GPU --.

<u>Column 7,</u>  
Line 23, change "GLUT" to read -- GPU --.  
Lines 52 & 54 change "33P" & "33D", to read -- 33D --.

<u>Column 9,</u>  
Line 46, change "33F", to read -- 33F --.

<u>Column 18,</u>  
Line 5, change "device", to read -- apparatus --.

Signed and Sealed this

Eighteenth Day of June, 2002

*Attest:*

*Attesting Officer*

JAMES E. ROGAN  
*Director of the United States Patent and Trademark Office*